Jan. 15, 1935. C. E. NORTH 1,987,865
APPARATUS FOR WASHING AND STERILIZING MILK PASTEURIZING CONTAINERS
Filed Feb. 2, 1931 3 Sheets-Sheet 1
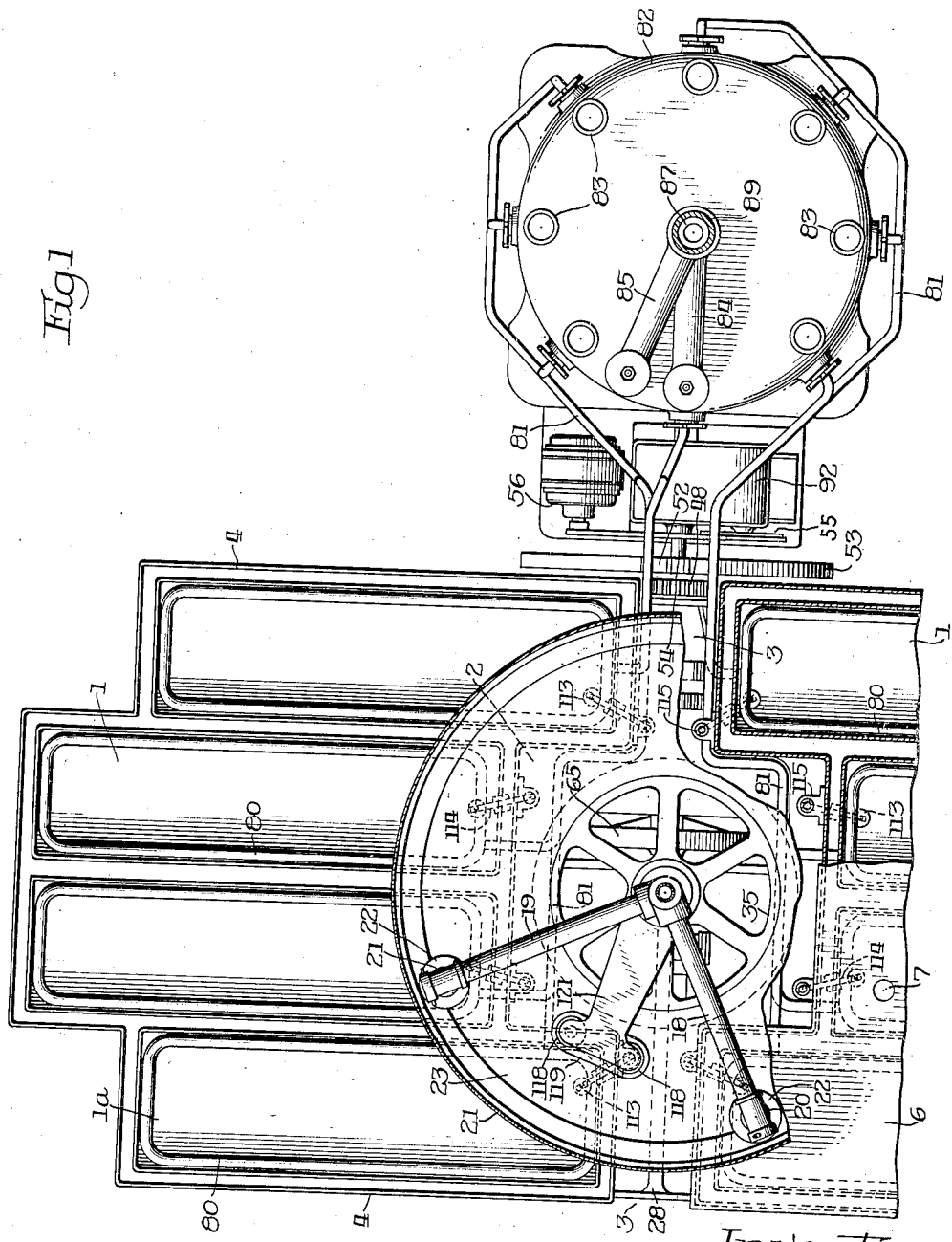
Inventor:
Charles E. North
By Hewitt S. Dixon Atty

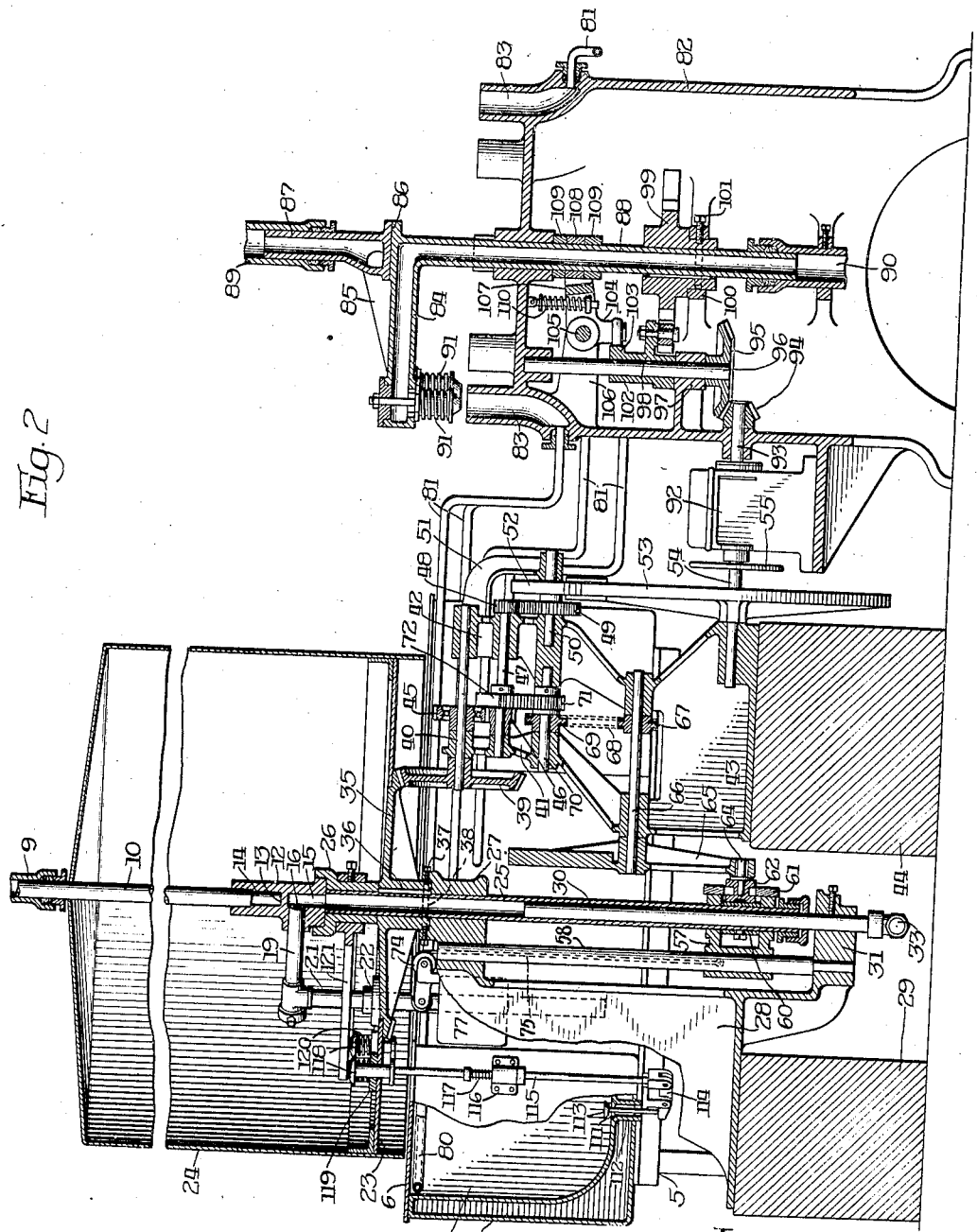

Jan. 15, 1935.  C. E. NORTH  1,987,865
APPARATUS FOR WASHING AND STERILIZING MILK PASTEURIZING CONTAINERS
Filed Feb. 2, 1931  3 Sheets-Sheet 3
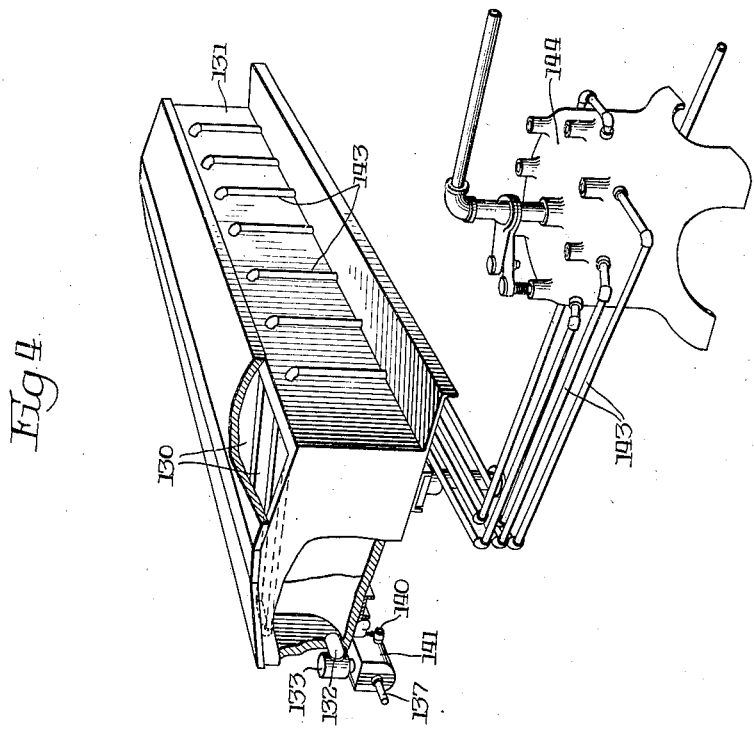
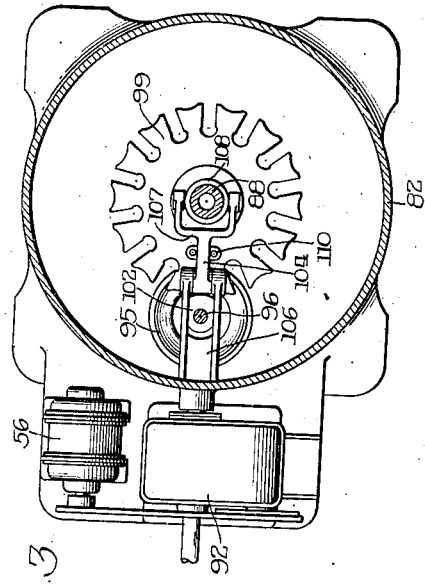
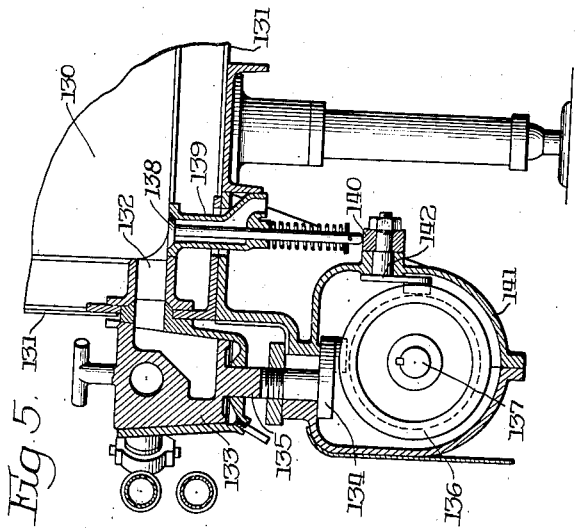
Inventor:
Charles E. North.
By Hewitt S. Dixon Atty Patented Jan. 15, 1935

1,987,865

UNITED STATES PATENT OFFICE 1,987,865

APPARATUS FOR WASHING AND STERILIZING MILK PASTEURIZING CONTAINERS

Charles E. North, Montclair, N. J., assignor to The Creamery Package Mfg. Company, Chicago, Ill., a corporation of Illinois Application February 2, 1931, Serial No. 512,904

4 Claims. (Cl. 141—1)

The invention relates to the washing and sterilizing of the milk containers used in the batch or holding type of pasteurizing apparatus and more especially to the automatic cleansing of such containers between the successive charges of milk held therein for the pasteurization treatment.

There is an infection of holding tanks in milk pasteurizing apparatus by a species of bacteria capable of growing in hot milk at the pasteurizing temperature. These have been designated "thermophyllic" organisms. They also have the characteristic of developing a viscous material by which they adhere to the walls of milk holding tanks or compartments. By their multiplication in the course of a few hours run of milk through the pasteurizing apparatus they are capable of increasing the bacterial count of the finished milk largely in excess of the accepted standards.

Another source of difficulty in obtaining a finished product having small bacterial count has been the accumulation of foam in the milk holding tanks. Because of its air filled condition the foam does not hold the pasteurizing temperature of the liquid milk and the bacteria in the foam are not effectively destroyed. Remedies have been attempted for the prevention of foam and for the special heating of the foam but with indifferent success.

Heretofore, washing and sterilizing of pasteurizing apparatus has been done, according to common practice, after the pasteurizing process has been completed and the apparatus shut down. The conditions above recited have been uncorrected during the operative run of the apparatus, to the detriment of the quality of the pasteurized milk.

It is the principal object of this invention to destroy the thermophyllic and other bacteria and to remove all foam from within each holding tank or container immediately before the entry into the tank of each successive batch of milk.

Another object is to thoroughly cleanse the milk holding containers while the pasteurizing process is in operation, by applying sterilizing fluids to the milk contacting surfaces of the containers in the intervals between their emptying and refilling with the successive batches of milk.

A further object is to provide for the automatic application during those intervals to the surfaces of the holding tanks or compartments of a cleansing solution followed by a sterile rinse, and for the draining away of such fluids before the tank or compartment is refilled with milk, thus providing that the heated milk flowing into the pasteurizer always enters a holding container which has just been cleaned and sterilized.

Other objects and advantages will be apparent in the following description of a preferred embodiment of the invention as disclosed in the accompanying drawings. It will be understood, however, that many changes in form, construction and arrangement may be made by those skilled in the art without departing from the spirit and scope of the invention as expressed in the appended claims.

Referring to the drawings, Fig. 1 is a plan view of apparatus embodying the invention as adapted to one type of pasteurizing holder characterized by having a central rotary mechanism for filling and emptying the several holding compartments grouped thereabout. Fig. 2 is a sectional elevation on a plane through the axes of the filling and emptying and of the washing fluid applying mechanisms. Fig. 3 is a sectional plan of the washing fluid applying mechanism with its upper portion removed. Fig. 4 illustrates the adaptation of the washing fluid applying apparatus to another type of holder in which the holding compartments are arranged in longitudinal series with individual valves for filling and emptying the compartments. Fig. 5 is a sectional elevation of a valve control mechanism for the latter type of holder.

The milk pasteurizing holder illustrated herein is similar to that described and claimed in my Patent No. 1,791,511, issued February 10, 1931. It comprises preferably two groups of four rectangular compartments or tanks 1 arranged with their adjacent ends spaced from each other to form a central space 2 with communicating lateral spaces 3. Each group of tanks is surrounded by an outer shell or jacket 4 spaced from the tank walls, the intervening space being adapted for the circulation of a heating medium, in manner well known to the art.

The tanks and their outer jackets are supported upon suitable standards 5. A cover 6 is provided for each group of tanks, (in Fig. 1 the cover is removed from one group) the covers having an opening 7 over each tank or compartment for the introduction of the filling and emptying tubes, the openings being equidistant and arranged in a circle including both groups.

A milk inlet pipe is indicated at 9 (Fig. 2) through which the milk is supplied to an inner pipe 10 in free telescopic relation to the pipe 9. The lower end portion of the pipe 10 is secured in a tubular bracket 12, the inner bore of which is divided by a partition 13 into two axial chambers 14 and 15 without inter-communication. Each of the chambers has a lateral opening, one of which is indicated at 16 (the opening into chamber 14 being in that portion of the bracket 12 which is cut away in the sectional view in Fig. 2). The two openings communicate respectively with a pair of radially extending tubular arms or pipes 18 and 19 secured to and supported by the bracket 12. The pipes 18 and 19 are in angular relation, their outer end portions being spaced by twice the distance between adjacent openings 7 in the tank covers, and respectively supporting in communication therewith a depending supply pipe 20 and a depending discharge pipe 21.

The supply and discharge pipes 20 and 21 are vertically slidable through suitable bearing rings 22 mounted in the bottom wall 23 of a rotatable dome structure 24 enclosing the operative milk conduits above described and having its axis coincident with that of the pipe 10 and bracket 12. By rotation of the dome and conduit structure, the supply and discharge tubes 20 and 21 may be registered with any pair of alternate openings 7 and the tubes lowered therethrough to fill one and empty another of the tanks 1, as hereinafter described.

Secured co-axially to the lower end portion of the bracket 12, and in communication with the chamber 15, is a vertical milk outlet pipe and supporting tube 25, its upper end carrying a union collar 26 threaded upon the lower end of the bracket 12. The tube 25 is partly supported for rotative and reciprocatory movement within a bearing provided in the upper arm 27 of a stationary bracket or standard 28 fixed upon a base 29. The tube 25 is further supported in telescopic relation with an inner stationary pipe or tube 30 rigidly secured in a lower arm 31 of the standard 28. The tube 30 is in communication with a milk outlet pipe 33 leading to a pump (not shown) for withdrawing the milk by suction from the tanks 1 through the discharge tube 21.

The rotative movement of the structure comprising the milk supply and discharge conduits is accomplished by means of a bevel gear 35 secured to the bottom wall 23 of the rotatable dome, and mounted in coaxial relation to the tube 25, the latter having a longitudinally slidable bearing in the hub 36 of the gear but keyed thereto for rotation with the gear and dome. The gear hub 36 supports the weight of the dome structure, its lower face having operative bearing in a recess upon the upper face of the standard arm 27. The hub 36 is retained against axial movement by screws 37 mounted in the arm 27 and extending into a circumferential groove 38 formed in the hub.

The gear 35 is driven by a bevel pinion 39 rigidly mounted on a shaft 40 having spaced bearings in a pair of bracket arms 41 and 42 extending upward from a standard 43 fixed upon a base 44. The shaft 40 carries a rigidly mounted spur gear 45 driven by a pinion 46 mounted on a shaft 47 having bearings in the arms 41 and 42. The shaft 47 endwardly carries a gear 48 in driven engagement with a gear 49 mounted on a shaft 50 having bearings in the arm 42 and in an outer bracket extension 51 thereof. Mounted on the shaft 50 in rigid relation to the gear 49 is a star wheel member 52 of a conventional Geneva stop mechanism, the star wheel having operative engagement with a driving member 53 mounted on a drive shaft 54 extending into driven connection with a conventional housed gear speed transformer 92 provided with a driving pulley 55 having belt driven connection with a motor 56.

The reciprocatory movement of the milk conduit structure is accomplished by means of a vertically slidable bracket 57, one end of which has a sliding bearing upon a stationary guide rod 58 secured in the standard arms 27 and 31 and positioned parallel to the axis of the tubes 25 and 30. The bifurcated other end of the bracket 57 embraces the tube 25, the latter having a collar 60 secured thereto between the arms of the bracket so that the bracket and tube are secured against relative longitudinal movement while permitting free rotative movement of the tube in the bracket.

Rigidly secured to the bracket 57 is a Scotch yoke 61 within which is operatively mounted a cross head 62 carrying a crank pin 64 extending into a bearing provided in the rim of a driving wheel 65 mounted on a shaft 66 having bearings in the arms 41 and 42. The shaft 66 carries a sprocket 67 driven by a chain belt 68 running over a driving sprocket 69 mounted on a shaft 70 having its bearings in the arms 41 and 42. The shaft 70 also carries a gear 71 in driven engagement with a gear 72 secured on the shaft 47.

As a counter balance for the weight of the milk conduit structure, a weight 77 is suspended from a cable 75 supported on sheaves 74 and attached to the bracket 57.

The gear trains above described, actuated by the Geneva stop mechanism, are operable to impart rotative and reciprocatory movement to tube 25 and the milk supply and discharge conduits supported thereby, in the cycle of first, lifting the milk tubes out and clear of the holding tank structure, second, rotating the tubes one step in the circle of tank openings, and third, lowering the tubes into the next successive holding tanks. These alternate movements are accomplished by constructing the driving gears 46 and 72, and the driven gears 45 and 71, for intermittent power transmission to the shafts 40 and 70 in required sequence, by an arrangement of toothed and rest segments in the respective gears, as fully illustrated and described in my previously mentioned Patent No. 1,791,511.

While the milk supply and discharge tubes are being elevated from one pair of holding tanks and moved over and lowered into the next pair to be served, the milk flow to and from those tubes is stopped. This is accomplished either by means of valves in the ends of the tubes as illustrated and described in my aforesaid patent or preferably by means fully illustrated and described in my copending application Serial No. 287,715, filed June 23, 1928, which has matured into Patent No. 1,973,772, granted September 18, 1934, and which it is deemed not necessary to illustrate herein. In general, that means comprises a pair of pumps respectively connected in the milk supply and milk discharge conduits, the pumps being driven preferably by electric motors, and the electric circuits to the motors being controlled by contact devices associated with the driving member 53, so that during that portion of the cycle of movement of the driving member wherein the conduit moving mechanism is actuated, the motor circuits are opened and the pumps are stopped.

In illustration of an embodiment of my present invention, I have adapted it to the pasteurizing holder above described which is the subject matter of my first aforesaid patent. Continuing with a description of the present invention, each of the tanks or compartments 1 is provided about its top or rim portion with a pipe 80 having holes in its underside for spraying the cleansing fluid upon the side walls of the tank. Each of the spray pipes 80 is connected with an individual supply pipe 81, the several supply pipes leading to a distributing mechanism by which the dosing of the respective tanks is timed to the intervals between their being emptied and re-filled with milk, and by which a charge of cleansing fluid and a succeeding charge of rinsing fluid is supplied under pressure to the lead pipes 81.

The distributing mechanism, in the embodiment illustrated, comprises a casing or standard 82 in the top portion of which is provided a circular series of upwardly open tubes 83 into each of which is connected one of the supply pipes 81. Positioned above the tubes is a pair of conduit arms 84 and 85 arranged in angular relation with only one of their outer spaced ends overlying the tubes 83 at any one time. The conduit arms are supported at their inner ends upon a partitioned chambered fixture 86 having an upper tubular extension 87 communicating with the arm 85 and a lower tubular extension 88 communicating with the arm 84, the tubular extensions being in vertical axial coincidence with the circular series of the tubes 83. The upper extension 87 is in free rotatable and reciprocatory telescopic relation to a stationary tube 89, and the lower extension 88 is in similar relation to a stationary tube 90, the tubes 89 and 90 being supported in any suitable manner and serving respectively to supply cleansing fluid and rinsing fluid to the respective arms 85 and 84, from any suitable source of pressure supply (not shown).

At the outer end of each of the conduit arms 84 and 85 is mounted a depending valve 91, of well known structural type, operable by depression of the conduit arm supporting structure to engage one of the tubes 83 and open communication between the respective arms and the tube so engaged, thereby permitting the flow of fluid through the tube and its connecting pipe 81 to one of the spray pipes 80, and spraying the side walls of that particular tank during the period of engagement of the valve with the tube.

Referring to Fig. 1, and assuming the milk emptying pipe 19 and the milk filling pipe 18 to be rotatable clock-wise, it will be noted that there is one tank 1ª between those with which the pipes 19 and 18 are in communication, and which in the operation of the tank filling and emptying mechanism will remain empty during one period of the intermittent progressive rotative movement of the arms 19 and 18. During that period the valve carried by the arm 85 is depressed into engagement with the tube 83 communicating with the spray pipe in that tank, and a dose of cleansing fluid, such as an alkali solution, is sprayed into the tank. Thereafter, and during the same period, the arms are moved and arm 84 is depressed to cause engagement of its valve with the same tube 83 and thereby delivering a flow of hot water to the spray pipe for rinsing the tank walls. This cycle of cleansing and rinsing is accomplished in each tank 1 during its empty period by synchronizing the movements of the arms 84 and 85 with the progressive advance of the milk pipes 18 and 19.

The synchronization may be accomplished by use of the gear speed transformer 92, from which a shaft 93 is shown extending through a suitable bearing in the casing 82 and carries a bevel drive pinion 94 engaging a gear 95 mounted on a vertical shaft 96 having its bearing in a bracket 97 formed on the casing wall. Secured on the shaft 96 is a driving element 98 of a conventional Geneva stop mechanism of which the driven element 99 is mounted on the tubular extension 88, being keyed thereto to cause rotation of the member 88 but permitting longitudinal movement of the member 88 within the element 99. The element 99 is operatively supported upon a stationary bracket 100 and retained against axial movement by a detent 101 mounted in the bracket and extending into a suitable circumferential groove in the hub of the element 99.

The driver element 98 is formed with an axial extension 102 upon which is formed a radial cam 103 rotatably engaging one arm of a bell crank 104 pivotally supported upon a pin 105 mounted in a bifurcated bracket 106 formed on the casing wall. The other arm of the bell crank forms a yoke 107 embracing the tube 88 and carrying conventional pins extending into engagement with the shifting collar 108 rotatably mounted on the tube 88 and secured longitudinally of the tube by the abutting collars 109 fastened to the tube. By this arrangement the bell crank 104 operates to lift the tube 88, thus lifting the valves 91 into free position, while the member 99 rotates the tube 88 to move the arms 84 and 85 with their valves through one step, whereupon the crank 104 again lowers the tube 88 to re-engage one of the valves. Compression springs 110 may be provided to assure the return of the bell crank to lowered position.

Having sprayed cleansing fluids upon the walls of the milk tanks, it is of course necessary to clear the tanks of those fluids before milk is again admitted thereto. This is accomplished by providing a drain valve at the lowermost point in the wall of each of the milk tanks, the valve being automatically opened at the beginning of the spraying operation, and closed just before milk is re-admitted to the tank. One of the valves is illustrated in detail in Fig. 2. An opening 111 is provided in the bottom of the tank wall leading to a sleeve 112 opening outwardly of the tank and milk conduits. While not shown herein, a connection to a sewer is preferably provided for the sleeve 112. The opening 111 is controlled by a poppet valve 113, the stem of which is guidingly supported in the sleeve 112 and extends into operative engagement with one end of a lever 114 centrally pivoted upon a suitable stationary bracket provided on the under structure of the tank support. The other end of the lever 114 is pivotally connected to an upright operating rod 115, terminating beneath the bottom wall 23 of the revolving dome structure, and supported for longitudinal movement in a bracket 116 secured to the tank jacket structure. The rod is normally held in upper position by a compression spring 117 whereby the valve 113 is normally seated in closure of the opening 111.

For the operation of the rods 115, there is provided a pair of plungers 118 supported for longitudinal movement in a plate 119 mounted on the bottom wall of the revolving dome structure. Each of the plungers 118 is provided with top and bottom end flanges or collars to limit their movement, and are normally held in upper position by compression springs 120. One such plunger would be preferable, but in the present adaptation it is more convenient to provide two plungers than to arrange the rods 115 at equidistant points in a circle, due to the form of the tank structure.

At each step in the rotation of the milk tank emptying and filling mechanism, one or the other of the plungers 118 is positioned over the rod 115 controlling the drain valve in the tank then emptied of its milk content. Depression of the plungers 118 and the rod 115 therebelow, to open the drain valve, is effected by an arm 121 rigidly secured to the collar 26 and extending over the upper ends of the plungers. The arm 121 engages and depresses the plungers when the milk conduit structure is in lowered position, and is elevated free of the plungers when the conduit structure is elevated. By this means the drain valve in the empty tank is open only during the period that the tanks on either side of it are being emptied and filled, and during which period the cleansing fluids are being sprayed into the empty tank.

Figs. 4 and 5 show a modified adaptation of the invention to another type of holder. Here, the milk holding tanks 130 are in longitudinal series within a heating jacket enclosure 131. The common milk inlet and outlet 132 to each tank is controlled by a two way plug valve 133 rotatable in its seat by a crank lever 134 secured to the valve stem 135, the lever being actuated by a drum cam 136 mounted on a power shaft 137. The cleansing fluid drain valve 138 is located adjacent the common milk inlet and outlet, the stem of which is supported in the drain outlet casing 139 and extends into operative contact with a crank lever 140 pivotally mounted on the cam case 141 and rigidly connected with a crank lever 142 having operative engagement with the drum cam 136. The cam 136 is so designed that the drain valve 138 is open only when the milk valve 133 is closed after having emptied the tank 130.

Each of the tanks is provided with a cleansing fluid spray pipe, as previously described, each having a supply pipe 143 leading to the distributing mechanism 144, constructed and operating as previously described. The synchronization of the milk valve control mechanism and the cleansing fluid distributing mechanism may be accomplished by a connected drive, as previously described, or by synchronized motor drive for each mechanism. The invention may be similarly adapted to milk pasteurizing apparatus of the type comprising independent holding tanks.

It will here be apparent that I have provided effective automatic means for accomplishing the thorough cleansing of milk pasteurizing holders in timed sequence with the filling, holding and emptying operations, so that each successive charge of milk is held in a freshly cleansed and sterilized holding tank.

I claim as my invention:

1. In milk pasteurizing apparatus, the combination of a series of receptacles for holding milk, means for filling and emptying said receptacles in successive rotation, said means providing a time interval after the emptying and before the refilling of each receptacle, means for applying cleansing fluids to the walls of each receptacle, and means operable during said interval for successively connecting said applying means with a source of supply of washing fluid and a source of supply of rinsing or sterilizing fluid.

2. In milk pasteurizing apparatus, the combination of a series of stationary milk holding containers, means for filling and emptying said containers successively, said means providing an interval after the emptying and before the refilling of each container, means in each container for discharging cleansing fluid upon the walls thereof, a series of tubes having connection respectively with said discharging means, a movable conduit having connection for a supply thereto of cleansing fluid, said conduit normally being disconnected from said tubes, and means operable to move said conduit to selectively connect said conduit with said tubes and cause cleansing fluid to flow to the discharging means in the respective containers during the said interval.

3. In milk pasteurizing apparatus, the combination of a series of milk holding containers, means for filling and emptying said containers successively, said means providing an interval after emptying and before the refilling of each said container, fluid spraying means in each container, a series of tubes respectively having connection with said spraying means, a plurality of conduits having connections adapted for the supply thereto of washing and rinsing fluids, said conduits being successively connectible to each of said tubes selectively, and means for effecting successive connection of said conduits with each said tube during the said interval for the spraying of said fluids into each said container.

4. In apparatus of the class described, a milk holding container, a drain outlet in said container, a valve controlling said outlet and normally effecting closure thereof, operating means for said valve, a reciprocatory device for alternately connecting a milk filling pipe and a milk emptying pipe with said container, there being a time interval after the disconnection of said emptying pipe and before the connection of said filling pipe with said container, means for projecting cleansing fluid into said container during said interval, and means carried by said reciprocatory device for engagement with said valve operating means during said interval whereby said valve is opened only during said interval.

CHARLES E. NORTH.